United States Patent
Hoover et al.

(10) Patent No.: US 10,988,261 B2
(45) Date of Patent: Apr. 27, 2021

(54) FLEXIBLE WALL MOUNT FOR AIRCRAFT CABIN SEAT

(71) Applicant: AMI Industries, Inc., Colorado Springs, CO (US)

(72) Inventors: Douglas E. Hoover, Colorado Springs, CO (US); Dominic J. Maglia, Pueblo, CO (US)

(73) Assignee: AMI Industries, Inc., Colorado Springs, CO (US)

( * ) Notice: Subject to any disclaimer, the term of this patent is extended or adjusted under 35 U.S.C. 154(b) by 376 days.

(21) Appl. No.: 15/957,082

(22) Filed: Apr. 19, 2018

(65) Prior Publication Data
US 2019/0322372 A1  Oct. 24, 2019

(51) Int. Cl.
*B64D 11/06* (2006.01)

(52) U.S. Cl.
CPC ...... *B64D 11/0698* (2014.12); *B64D 11/0619* (2014.12); *B64D 11/0691* (2014.12)

(58) Field of Classification Search
CPC ............ B64D 11/0698; B64D 11/0619; B64D 11/0691
USPC .......................................................... 297/14
See application file for complete search history.

(56) References Cited

U.S. PATENT DOCUMENTS

| | | | |
|---|---|---|---|
| 3,968,863 A * | 7/1976 | Reilly | B64D 25/04 188/372 |
| 4,943,027 A | 7/1990 | Nakayama | |
| 5,791,687 A * | 8/1998 | Gotou | B60R 22/201 280/805 |
| 5,836,547 A | 11/1998 | Koch et al. | |
| 6,250,681 B1 * | 6/2001 | Takahashi | B60R 22/28 280/801.2 |
| 7,445,181 B2 | 11/2008 | Knoll et al. | |
| 8,678,439 B2 | 3/2014 | Marziani | |
| 8,678,465 B1 | 3/2014 | Aragon et al. | |
| 8,840,163 B1 | 9/2014 | Wilhelm et al. | |
| 9,132,753 B1 | 9/2015 | Campbell | |
| 9,132,754 B2 | 9/2015 | Mindel et al. | |
| 10,059,295 B2 * | 8/2018 | Sudo | B60R 21/04 |

FOREIGN PATENT DOCUMENTS

| | | |
|---|---|---|
| RU | 2620443 | 5/2017 |
| WO | 0226524 | 4/2002 |

OTHER PUBLICATIONS

European Patent Office, European Search Report dated Oct. 23, 2019 in Application No. 19168382.0.

* cited by examiner

*Primary Examiner* — Mark R Wendell
(74) *Attorney, Agent, or Firm* — Snell & Wilmer L.L.P.

(57) ABSTRACT

A mount assembly for mounting a cabin attendant seat to a support structure may comprise a first strap configured to plastically deform in response to a deflection of the support structure. The first strap may comprise a first perforation, a second perforation, and a third perforation located between the first perforation and the second perforation. The perforations may be configured to allow the strap to plastically deform.

10 Claims, 7 Drawing Sheets

FLEXIBLE WALL MOUNT FOR AIRCRAFT CABIN SEAT

FIELD

The present disclosure relates to mounting assemblies, and, more specifically, to a mount assembly for a cabin attendant seat.

BACKGROUND

Cabin attendant seats are used for flight attendant safety and comfort during taxi, takeoff, landing, and inflight rest periods. Cabin attendant seats may be mounted to an aircraft partition. Aircraft partitions are generally flexible, particularly when subjected to a large dynamic load, like those generated during a crash or rejected take-off. Such events may cause the partition structure to flex and/or bend, thereby imparting increased loads onto its mating components. For example, a 16 g (i.e., sixteen times the force of gravity) dynamic event, may lead to a failure of either the partition structure or its mating components.

SUMMARY

A mount assembly for mounting a cabin attendant seat to a support structure is disclosed herein. In accordance with various embodiments, the mount assembly may comprise a first strap configured to plastically deform in response to a deflection of the support structure. The first strap may comprise a first perforation located proximate a first end of the first strap, a second perforation located proximate a second end of the first strap opposite the first end of the first strap, and a third perforation located between the first perforation and the second perforation. A first spacer may be located proximate the third perforation. The first spacer may be configured to extend from the first strap and contact a surface of the support structure.

In various embodiments, the first perforation may be configured to align with a first fastener opening defined by the cabin attendant seat. The second perforation may be configured to align with a second fastener opening defined by the cabin attendant seat. The third perforation may be configured to align with a third fastener opening defined by the support structure.

In various embodiments, a length of the first perforation, as measured in a first direction extending from the first end of the first strap to the second end of the first strap, may be greater than a length of the first fastener opening, as measured in the first direction. A length of the second perforation, as measured in the first direction, may be greater than a length of the second fastener opening, as measured in the first direction.

In various embodiments, a first fastener may be located through the first perforation. A second fastener may be located through the second perforation. A length of the first perforation may be configured to allow the first end of the first strap to translate toward the first fastener and accommodate a plastic deformation of the first strap. A length of the second perforation may be configured to allow the second end of the first strap to translate toward the second fastener and accommodate the plastic deformation of the first strap.

In various embodiments, the mount assembly may further comprise a second strap. The second strap may comprise a first perforation configured to align with a fourth fastener opening defined by the cabin attendant seat, and a second perforation configured to align with a fifth fastener opening defined by the support structure. A second spacer may be located proximate the second perforation of the second strap. The second spacer may be configured to contact the surface of the support structure. In various embodiments, a geometry of the third perforation of the first strap may be different from a geometry of the second perforation of the second strap.

Also disclosed herein is a cabin attendant seat. According to various embodiments, the cabin attendant seat may comprise a housing configured to mount to a support structure, and a first strap coupled to a wall of the housing. The first strap may comprise a first perforation. The first strap may be configured to plastically deform in response to a translation of the housing away from the support structure. A first fastener may be located through the first perforation and a first fastener opening of the housing. The first perforation may be configured to allow a first end of the first strap to translate relative to the first fastener in response to the translation of the housing away from the support structure.

In various embodiments, a spacer may be configured to extend from the first strap and contact a surface of the support structure. A length of the spacer, as measured from a surface of the first strap, may be less than a length of the wall of the housing, as measured from the surface of the first strap.

In various embodiments, a length of the first perforation, as measured in a first direction extending from the first end of the first strap to a second end of the first strap opposite the first end, may be greater than a length of the first fastener opening, as measured in the first direction. In various embodiments, the first strap may further comprise a second perforation and a third perforation. The first perforation may be located proximate the first end of the first strap. The second perforation may be located proximate the second end of the first strap. The third perforation may be located between the first perforation and the second perforation.

In various embodiments, a second fastener may be located through the second perforation and a second fastener opening of the housing. A length of the second perforation, as measured in the first direction, may be greater than a length of the second fastener opening, as measured in the first direction.

In various embodiments, a second strap may be coupled to the housing. The second strap may comprise a first perforation located proximate a first end of the second strap, a second perforation located proximate a second end of the second strap opposite the first end of the second strap, and a third perforation located between the first perforation of the second strap and the second perforation of the second strap. In various embodiments, a geometry of the third perforation of the first strap may be different from a geometry of the third perforation of the second strap.

A mount assembly is also disclosed herein. In accordance with various embodiments, the mount assembly may comprise a first strap. The first strap may comprise a first perforation a second perforation, and a third perforation. The first perforation may be located proximate a first end of the first strap and may be configured to receive a first fastener. The second perforation may be located proximate a second end of the first strap opposite the first end of the first strap and may be configured to receive a second fastener. The third perforation may be located between the first perforation and the second perforation and may be configured to receive a third fastener. A distance between a surface of the first perforation proximate the first end of the first strap and a surface of the second perforation proximate the second end of the first strap may be configured to allow the first end of the first strap to translate relative to the first fastener and the second end to translate relative to the second fastener.

In various embodiments, the first perforation may be configured to align with a first fastener opening. The second perforation may be configured to align with a second fastener opening. A length of the first perforation, as measured in a first direction extending from the first end of the first strap to the second end of the first strap, may be greater than a length of the first fastener opening, as measured in the first direction. A length of the second perforation, as measured in the first direction, may be greater than a length of the second fastener opening, as measured in the first direction.

In various embodiments, the mount assembly may further comprise a second strap. The second strap may comprise a first perforation located proximate a first end of the second strap, a second perforation located proximate a second end of the second strap opposite the first end of the second strap, and a third perforation located between the first perforation of the second strap and the second perforation of the second strap. In various embodiments, the mount assembly may further comprise a spacer configured to extend from a surface of the first strap and contact a support structure configured to receive the third fastener.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the exemplary embodiments of the disclosure, it should be understood that other embodiments may be realized and that logical changes and adaptations in design and construction may be made in accordance with this disclosure and the teachings herein. Thus, the detailed description herein is presented for purposes of illustration only and not limitation. The steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Surface cross hatching lines may be used throughout the figures to denote different parts but not necessarily to denote the same or different materials.

Throughout the present disclosure, like reference numbers denote like elements. Accordingly, elements with like element numbering may be shown in the figures, but may not be necessarily repeated herein for the sake of clarity. As used herein, "proximate" refers to a direction inward, or generally, towards a reference component.

Cabin attendant seats of the present disclosure may include a mount assembly configured to couple the cabin attendant seat to an aircraft partition. In various embodiments, the mounting assembly may comprise one or more strap(s) configured to plastically deform under increased loads and/or in response to a deflection or bending of the aircraft partition. The strap(s) may include a perforation at each end for receiving a fastener to mount the strap to the cabin attendant seat. The perforations are configured to allow the strap to translate relative to the fasteners during a plastic deformation of the strap. Accordingly, when the cabin attendant seat is subjected to an increased load (e.g., during a 16 g dynamic event), the straps may plastically deform, thereby acting as attenuation devices protecting both the cabin attendant seat and the partition from damage.

Although the embodiments herein are described with reference to a cabin attendant seat mounted to an aircraft partition, such embodiments are provided for example only, as it is contemplated that the disclosures herein have applicability to other structures which may be mounted to aircraft partitions and/or to other flexible support structures.

Figure 1A:
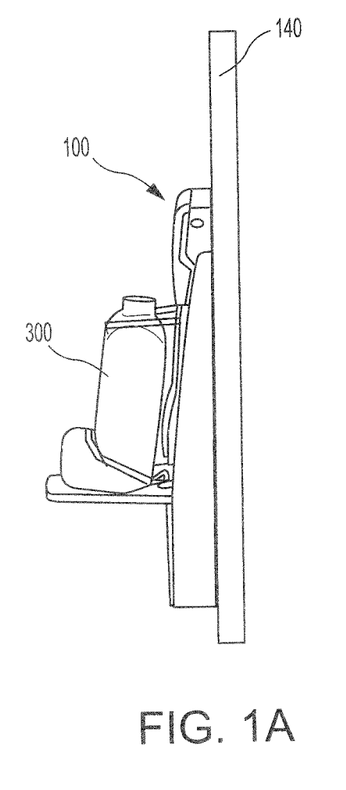
FIG. 1A illustrates a cabin attendant seat mounted to a support structure, in accordance with various embodiments.
Figure 1B:
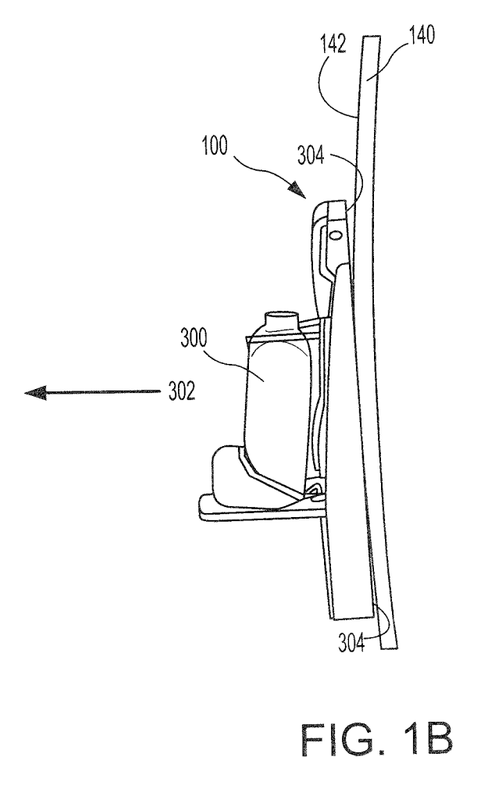
FIG. 1B illustrates the cabin attendant seat and support structure of FIG. 1A during an impact event, in accordance with various embodiments.

With reference to FIG. 1A, an exemplary cabin attendant seat 100 is illustrated mounted to a support structure 140. In various embodiments, support structure 140 may comprise an aircraft partition. FIG. 1B illustrates cabin attendant seat 100 mounted to support structure 140 during an impact or other dynamic load event (e.g., a crash, a rejected takeoff, etc.). During the dynamic load event, cabin attendant seat 100, and/or cabin attendant seat 100 and an occupant 300 of cabin attendant seat 100, may impart a load on support structure 140 in the direction of arrow 302. In various embodiment, the load may be greater than or equal to 16 g. The load may cause support structure 140 to deflect and/or bend. Stated differently, the load may cause, at least a portion of, a surface 304 of cabin attendant seat 100 to separate, or translate away, from a surface 142 of support structure 140.

Figure 2:
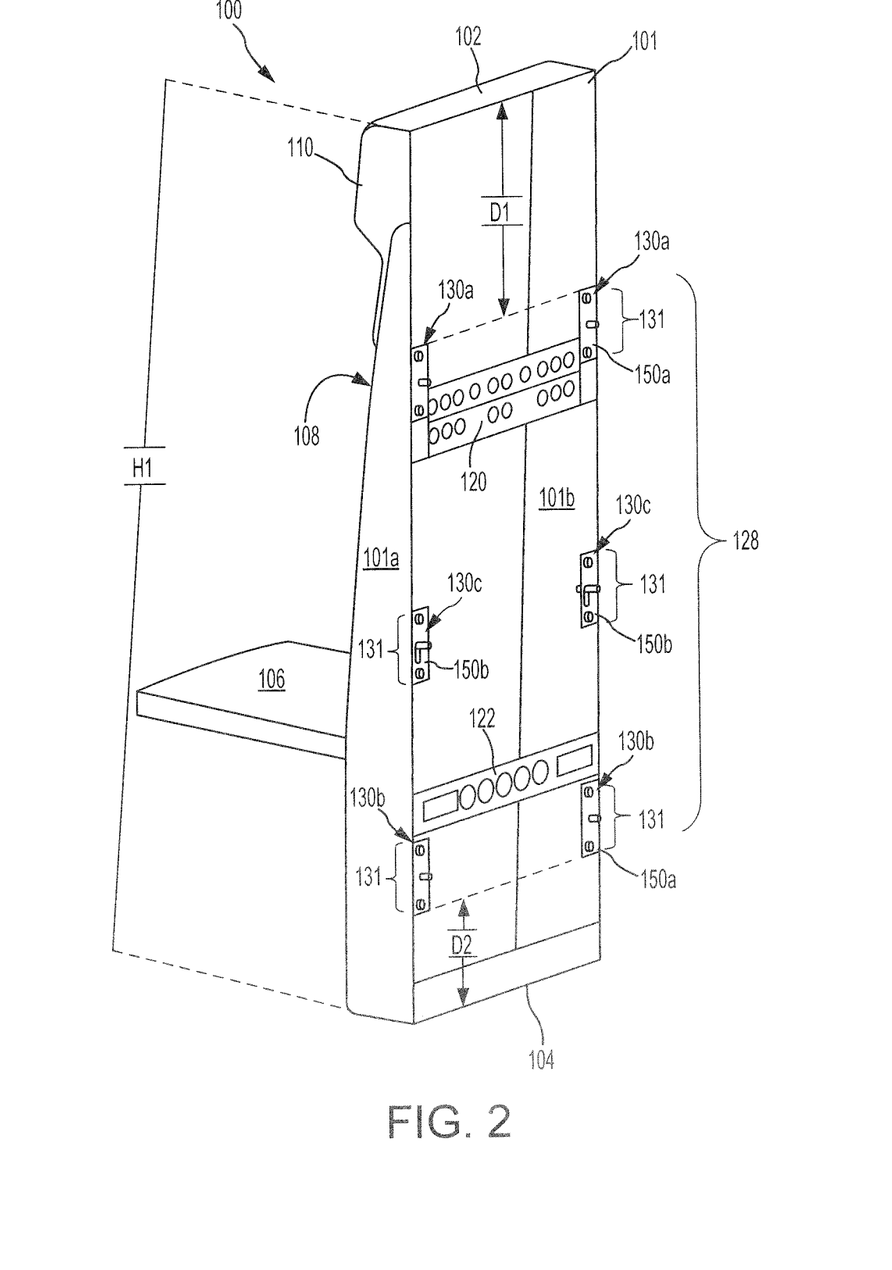
FIG. 2 illustrates a perspective view of a cabin seat having a mount assembly, in accordance with various embodiments.

With reference to FIG. 2, cabin attendant seat 100 is illustrated in a seat-down position, in accordance with various embodiments. Cabin attendant seat 100 may include a housing 101. Housing 101 includes opposing walls 101a and 101b, which extend from a head end 102 of housing 101 to a foot end 104 of housing 101. Cabin attendant seat 100 may include a seat pan 106, a backrest 108, and a headrest 110. Headrest 110 may be located proximate head end 102 of housing 101. Backrest 108 may be located generally between seat pan 106 and headrest 110. Seat pan 106 may be configured to rotate relative to housing 101. In this regard, seat pan 106 may rotate toward and away from backrest 108. An upper cross support 120 and a lower cross support 122 may extend between wall 101a and wall 101b.

In various embodiments, cabin attendant seat 100 may include a mount assembly 128. Mount assembly 128 may be configured to couple cabin attendant seat 100 to a support structure (e.g., support structure 140 of FIG. 1B). As discussed in further detail below, mount assembly 128 may be configured to attenuate deflection of the support structure and/or separation of cabin attendant seat 100 from the support structure, such that cabin attendant seat 100 may remain coupled to the support structure during the dynamic load event.

Mount assembly 128 may include a plurality of mounting points (e.g., mounting points 130a, mounting points 130b, and mounting points 130c) each having a bracket assembly 131 configured to secure housing 101 to a support structure. In various embodiments, mount assembly 128 may include mounting points 130a proximate upper cross support 120, mounting points 130b proximate lower cross support 122, and mounting points 130c between upper cross support 120 and lower cross support 122.

In various embodiments, mounting points 130a may be located between a midpoint of walls 101a, 101b and head end 102 of housing 101. The midpoint of walls 101a, 101b is located halfway between head end 102 and foot end 104 of housing 101. Mounting points 130b may be located between the midway point of walls 101a, 101b and foot end 104. In various embodiments, a distance D1 between mounting points 130a and head end 102 may be between 10% and 40% of a total height H1 of housing 101 extending from head end 102 to foot end 104. In various embodiments, a distance D2 between mounting points 130b and foot end 104 may be between 10% and 40% of height H1 of housing 101. Mounting points 130c may be located at approximately the midpoint of walls 101a, 101b. As used in the previous context only, "approximately" means within 10% of height H1 from the midpoint of walls 101a, 101b.

While mount assembly 128 is illustrated as having six mounting points (i.e., bracket assemblies 131) with two mounting points proximate upper cross support 120, two mounting points proximate lower cross support 122, and two mounting points proximate a midpoint of housing 101, it is further contemplated and understood that mount assembly 128 may include any number and/or configuration of mounting points (i.e., bracket assemblies).

Each mounting point includes a bracket assembly 131. Bracket assemblies 131 each include a strap 150a or a strap 150b. Strap 150a and strap 150b may be coupled to housing 101, and may be employed to mount, or secure, cabin attendant seat 100 to support structure 140, with momentary reference to FIG. 1.

Figure 3A:
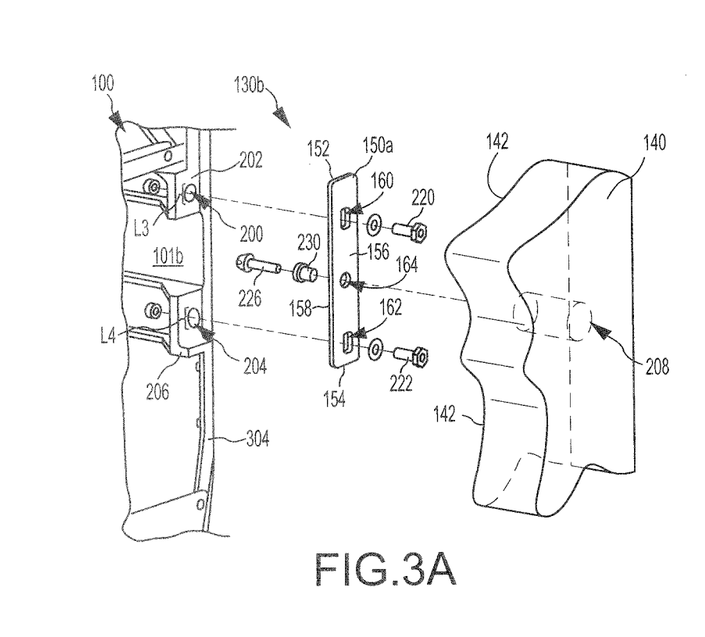
FIGS. 3A and 3B illustrate an assembly view of a mounting point, in accordance with various embodiments.

Referring to FIG. 3A, an assembly view of a mounting point 130b of cabin attendant seat 100 is illustrated. In various embodiments, mounting point 130b includes a strap 150a. Strap 150a includes opposing ends 152 and 154, and opposing surfaces 156 and 158 extending between end 152 and end 154. Strap 150a may comprise and define a first perforation 160, a second perforation 162, and a third perforation 164. First perforation 160 may be located proximate end 152. Second perforation 162 may be located proximate end 154. Third perforation 164 may be located between first perforation 160 and second perforation 162, and approximately half way between end 152 and end 154. First perforation 160, second perforation 162, and third perforation 164 are formed completely through strap 150a. Stated differently, first perforation 160, second perforation 162, and third perforation 164 extend from surface 156 to surface 158 of strap 150a.

First perforation 160 is configured to align with a first fastener opening 200 of wall 101b. For example, in various embodiments, wall 101b may comprise a flange 202 defining first fastener opening 200. First perforation 160 and first fastener opening 200 may be configured to receive a fastener 220. Fastener 220 may be located through first perforation 160 and first fastener opening 200, and may couple strap 150a to wall 101b. Fastener 220 may comprise a nut and a bolt, a screw, rivet, pin, clip, or other suitable securement mechanism.

Second perforation 162 is configured to align with a second fastener opening 204 of wall 101b. For example, in various embodiments, wall 101b may comprise a flange 206 defining second fastener opening 204. Second perforation 162 and second fastener opening 204 may be configured to receive a fastener 222. Fastener 222 may be located through second perforation 162 and second fastener opening 204, and may couple strap 150a to wall 101b. Fastener 222 may comprise a nut and a bolt, a screw, rivet, pin, clip, or other suitable securement mechanism.

Third perforation 164 is configured to align with a fastener opening 208 of support structure 140. Fastener opening 208 is configured to receive a fastener 226. Fastener 226 may comprise a screw, rivet, pin, clip, a nut and bolt, or other suitable securement mechanism. In various embodiments, support structure 140 may comprise a threaded portion (e.g., a nut, threaded insert, nut plate, etc.) defining fastener opening 208. In this regard, the threaded portion defining fastener opening 208 may engage fastener 226 to secure strap 150a and housing 101 to support structure 140. In various embodiments, third perforation 164 may comprise a generally circular geometry.

Figure 4A:
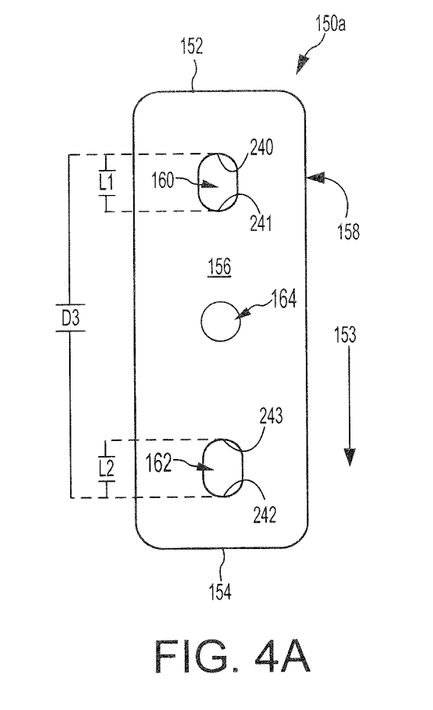
FIGS. 4A and 4B illustrate straps of a mount assembly, in accordance with various embodiments.

Referring to FIG. 4A, strap 150a is illustrated, in accordance with various embodiments. First perforation 160 comprises a length L1 extending between opposing surfaces 240 and 241 of first perforation 160. Second perforation 162 comprises a length L2 extending between opposing surfaces 242 and 243 of second perforation 162.

Figure 4B:
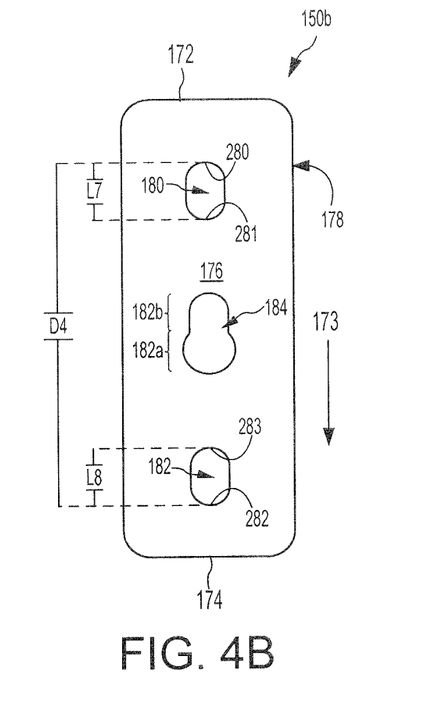
Figure 4C:
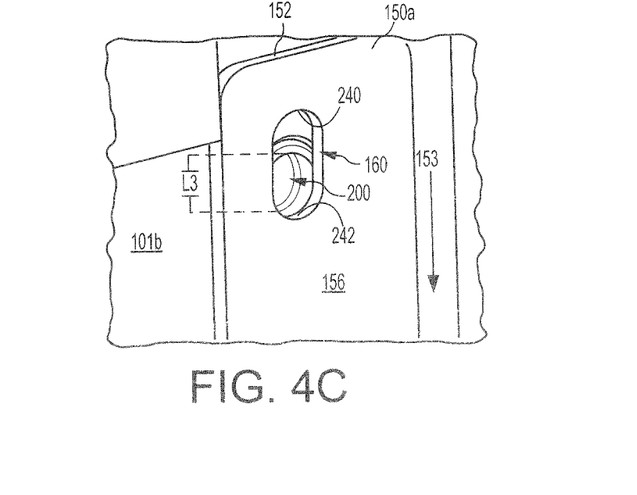
FIG. 4C illustrates alignment of a strap perforation and a fastener opening, in accordance with various embodiments.

With combined reference to FIG. 4A and FIG. 4C, length L1, as measured in a direction 153 extending from end 152 of strap 150a toward end 154, is greater than a length L3 of first fastener opening 200, as measured in direction 153.

With combined reference to FIG. 4A and FIG. 3A, length L2 is greater than a length L4 of second fastener opening 204, as measured in direction 153. Length L1 and length L2 may be configured to allow strap 150a to plastically deform. Stated ditfferently, a distance D3 between surface 240 of first perforation 160 and surface 242 of second perforation 162 may be selected to allow the portion of strap 150a that is between first perforation 160 and second perforation 162 to translate away from cabin attendant seat 100 in response to a bending of support structure 140 and/or a separation of surface 142 of support structure 140 from surface 304 of wall 101b.

Figure 5A:
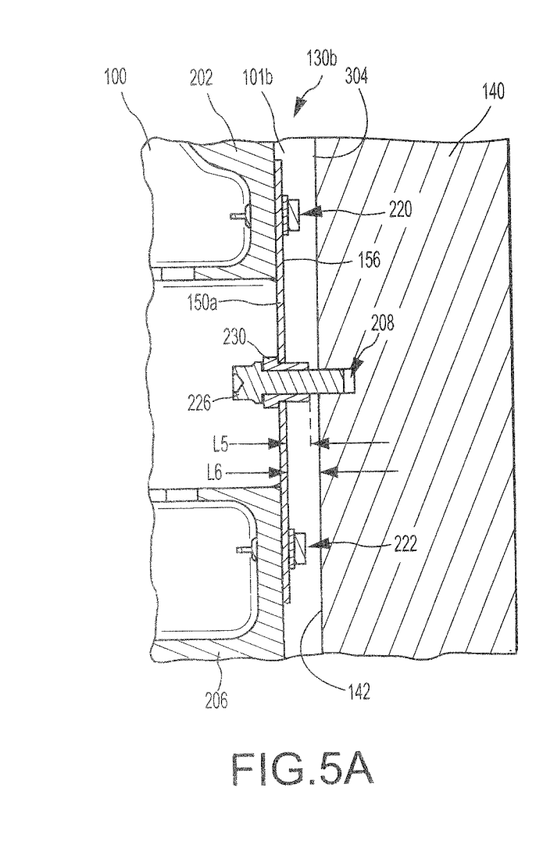
FIGS. 5A and 5B illustrate a side view and a perspective view, respectively, of a mounting point of a mount assembly, in accordance with various embodiments.
Figure 5B:
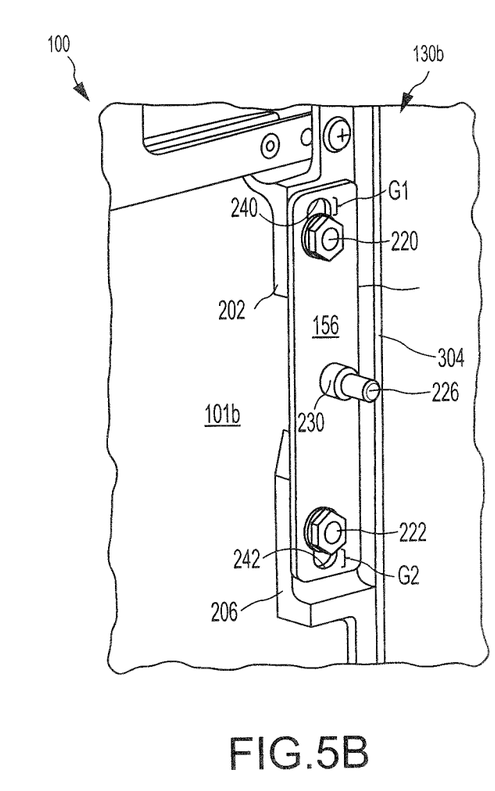

FIGS. 5A and 5B illustrate mounting point 130b prior to deformation of strap 150a (i.e., prior to an impact or other dynamic load event), in accordance with various embodiments. Prior to deformation of strap 150a, surface 240 of first perforation 160 may be located away from fastener 220, and surface 242 of second perforation 162 may be located away from fastener 222. In this regard, prior to deformation of strap 150a, a gap G1 may be located between fastener 220 and surface 240, and a gap G2 may be located between fastener 222 and surface 242. As strap 150a plastically deforms, end 152 translates toward and fastener 220, end 154 translates toward fastener 222, and gaps G1 and G2 may shrink. End 152 may continuing translating toward fastener 220 until surface 240 contacts fastener 220. End 154 may continuing translating toward fastener 222 until surface 242 contacts fastener 222.

Figure 5C:
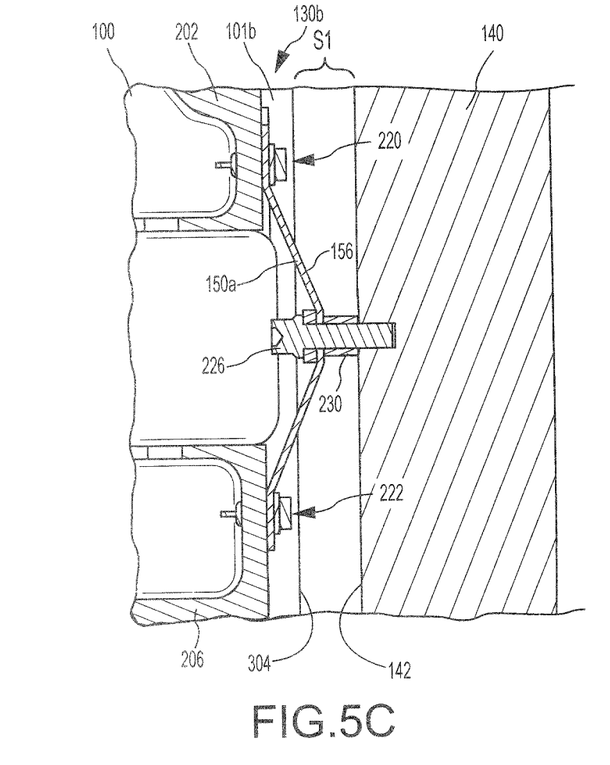
FIGS. 5C and 5D illustrate a side view and a perspective view, respectively, of a mounting point of a mount assembly after an impact event, in accordance with various embodiments.
Figure 5D:
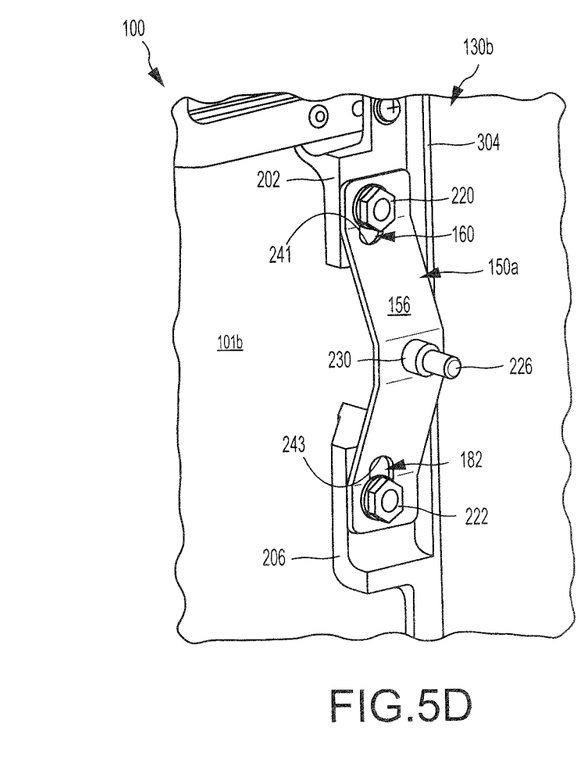

FIGS. 5C and 5D illustrate mounting point 130b after a plastic deformation of strap 150a (i.e., after an impact or other dynamic load event). In various embodiments, strap 150a is configured to plastically deform in response to a separation S1 of surface 304 of wall 101b from surface 142 of support structure 140, such that cabin attendant seat 100 may remain coupled to support structure 140 during the dynamic load event. Stated differently, the portion of strap 150a that is between first perforation 160 and second perforation 162 may translate away from cabin attendant seat 100 in response to a bending of support structure 140 and/or a separation of surface 142 of support structure 140 from surface 304 of wall 101b.

In various embodiments, the bracket assembly of mounting point 130b may include a spacer 230. Spacer 230 may be configured to extend through third perforation 164. In various embodiments, fastener 226 may be located through spacer 230. Spacer 230 may extend past surface 156 of strap 150a. When cabin attendant seat 100 is mounted to support structure 140, fastener 226 may be tightened until spacer 230 contacts surface 142 of support structure 140.

With reference to FIG. 5A, a length L5 of spacer 230, as measured from surface 156 of strap 150a, may be less than a length L6 of wall 101b, as measured from surface 156 of strap 150a. In various embodiments, a difference between length L6 and length L5 may be less than 0.05 inches (0.13 cm). In various embodiments, the difference between length L6 and length L5 may be less than 0.02 inches (0.05 cm). Length L5 being less than length L6 may cause surface 304 of wall 101b to contact surface 142 of support structure 140 prior to spacer 230 contacting surface 142, and may allow fastener 226 to preload strap 150a. For example, when cabin attendant seat 100 is mounted to support structure 140, surface 304 will be located in contact with surface 142, and after surface 304 contacts surface 142, fastener 226 may continue to be tightened (e.g., threaded into fastener opening 208) until spacer 230 contacts surface 142.

Figure 3B:
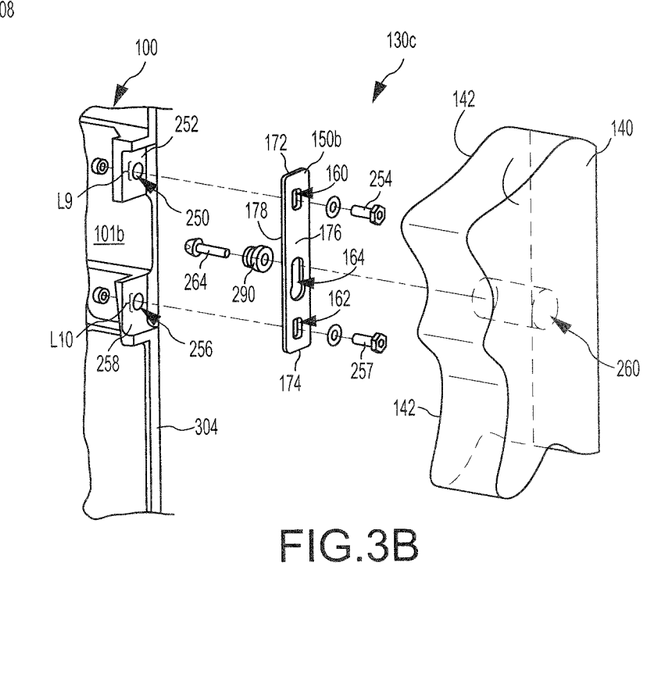

With reference to FIG. 3B, an assembly view of mounting point 130c is illustrated, in accordance with various embodiments. Mounting point 130c may include a strap 150b. Strap 150b includes opposing ends 172 and 174, and opposing surfaces 176 and 178 extending between end 172 and end 174. Strap 150b may comprise and define a first perforation 180, a second perforation 182, and a third perforation 184. First perforation 180 may be located proximate end 172. Second perforation 182 may be located proximate end 174. Third perforation 184 may be located between first perforation 180 and second perforation 182, and approximately half way between end 172 and end 174. First perforation 180, second perforation 182, and third perforation 184 are formed completely through strap 150b. Stated differently, First perforation 180, second perforation 182, and third perforation 184 extend from surface 176 to surface 178 of strap 150b.

First perforation 180 is configured to align with a first fastener opening 250 of wall 101b. For example, in various embodiments, wall 101b may comprise a flange 252 defining first fastener opening 250. First perforation 180 and first fastener opening 250 may be configured to receive a fastener 254. Fastener 254 may be located through first perforation 180 and first fastener opening 250, and may couple strap 150b to wall 101b. Fastener 254 may comprise a nut and a bolt, a screw, rivet, pin, clip, or other suitable securement mechanism.

Second perforation 182 is configured to align with a second fastener opening 256 of wall 101b. For example, in various embodiments, wall 101b may comprise a flange 258 defining second fastener opening 256. Second perforation 182 and second fastener opening 256 may be configured to receive a fastener 257. Fastener 257 may be located through second perforation 182 and second fastener opening 256, and may couple strap 150b to wall 101b. Fastener 257 may comprise a nut and bolt, a screw, rivet, pin, clip, or other suitable securement mechanism.

Third perforation 184 is configured to align with a fastener opening 260 of support structure 140. Fastener opening 260 is configured to receive a fastener 264. Fastener 264 may comprise a screw, rivet, pin, clip, a nut and bolt, or other suitable securement mechanism. In various embodiments, support structure 140 may comprise a threaded portion (e.g., a nut, threaded insert, nut plate, etc.) defining fastener opening 260. In this regard, the threaded portion defining fastener opening 260 may engage fastener 264 to secure strap 150b and housing 101 to support structure 140.

With reference to FIG. 4B, first perforation 180 comprises a length L7 extending between opposing surfaces 280 and 281 of first perforation 180. Second perforation 182 comprises a length L8 extending between opposing surfaces 282 and 283 of second perforation 182. Length L7, as measured in a direction 173 extending from end 152 toward end 154, is greater than a length L9 (FIG. 3B) of first fastener opening 250, as measured in direction 173. Length L8 is greater than a length L10 (FIG. 3B) of second fastener opening 256, as measured in the direction 173. Length L7 and length L8 may be configured to allow strap 150b to plastically deform. Stated differently, a distance D4 between surface 280 of first perforation 180 and surface 282 of second perforation 182 be selected to allow a middle portion of strap 150b (i.e., a portion located between first perforation 180 and second perforation 182) to translate away from cabin attendant seat 100 in response to a bending of support structure 140 and/or a separation of support structure 140 from surface 304 of wall 101b.

In various embodiments, third perforation 184 is a key hole slot. For example, third perforation 184 may comprise a first portion 184a having a generally circular geometry and a second portion 184b having a generally oblong geometry. In various embodiments, the geometry of third perforation 184 may be different from the geometry of third perforation 164 of strap 150a in FIG. 4A.

Figure 6:
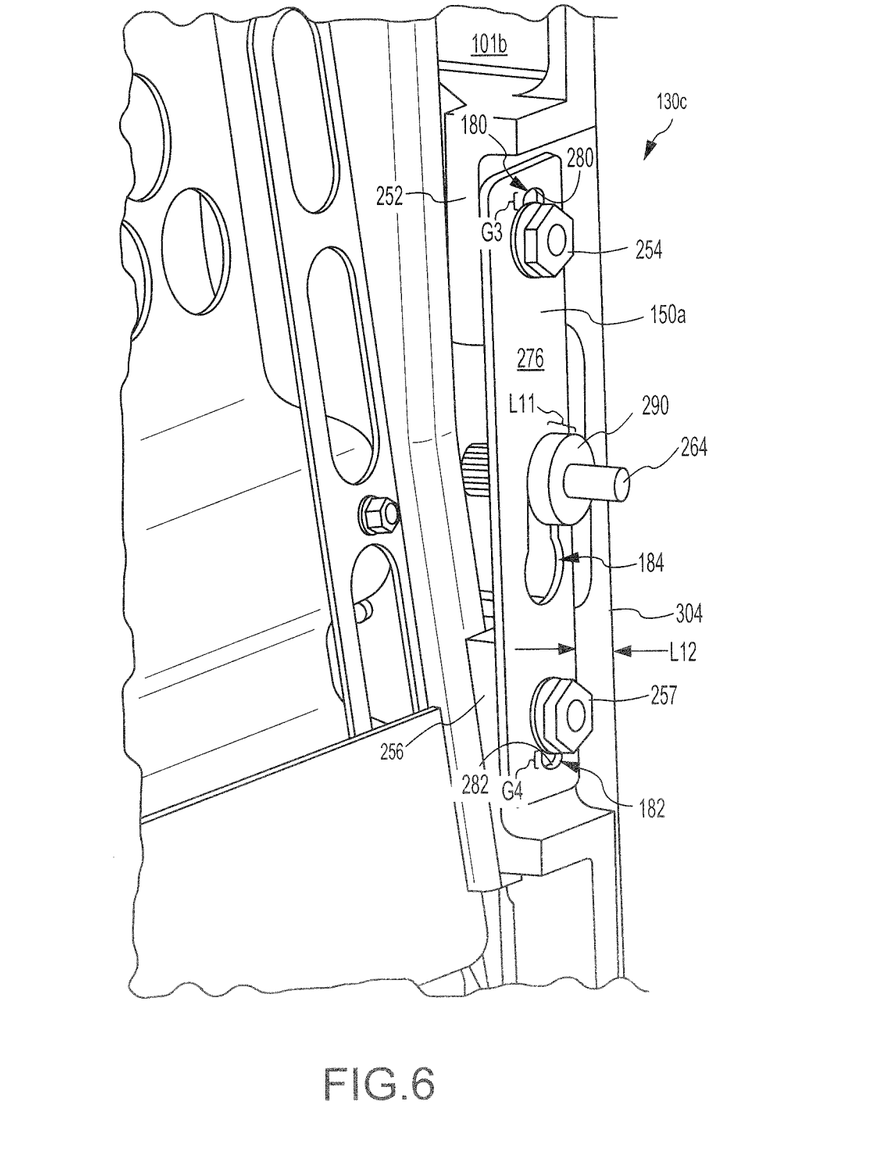
FIG. 6 illustrates a perspective view of mounting point of a mount assembly, in accordance with various embodiments.

FIG. 6 illustrates mounting point 130c prior to deformation of strap 150b, in accordance with various embodiments. Prior to deformation of strap 150b, surface 280 of first perforation 180 may be located away from fastener 254, and surface 282 of second perforation 182 may be located away from fastener 257. In this regard, prior to deformation of strap 150b, a gap G3 may be located between fastener 254 and surface 280, and a gap G4 may be located between fastener 257 and surface 282. As strap 150b plastically deforms, end 172 may translate toward and fastener 254, end 174 may translate toward fastener 257, and gaps G3 and G4 may shrink. End 172 may continuing translating toward fastener 254 until surface 280 contacts fastener 254. End 174 may continuing translating toward fastener 257 until surface 282 contacts fastener 257.

In various embodiments, the bracket assembly of mounting point 130c may include a spacer 290. Spacer 290 may be configured to extend through third perforation 184. In various embodiments, fastener 264 may be located through spacer 290. Spacer 290 may extend past surface 176 of strap 150b. Spacer 290 may be configured such that when cabin attendant seat 100 is mounted to support structure 140, fastener 264 may be tightened, until spacer 290 contacts surface 142 of support structure 140. A length L11 of spacer 290, as measured from surface 176 of strap 150b, may be less than a length L12 of wall 101b, as measured from surface 176 of strap 150b. In various embodiments, a difference between length L12 and length L11 may be less than 0.05 inches (0.13 cm). In various embodiments, the difference between length L12 and length L11 may be less than 0.02 inches (0.05 cm).

With combined reference to FIG. 3B and FIG. 6, length L11 being less than length L12 may cause surface 304 of wall 101b to contact surface 142 of support structure 140 prior to spacer 290 contacting surface 142, which may allow fastener 264 to preload strap 150b. For example, when mounting cabin attendant seat 100 to support structure 140, surface 304 of wall 101b may be located in contact with surface 142 of support structure 140, and after surface 304 contacts surface 142, fastener 264 may continue to be tightened (e.g., threaded into fastener opening 260), until spacer 290 contacts surface 142 of support structure 140.

A geometry of spacer 290 and/or fastener 264 may complement the key hole geometry of third perforation 184. In this regard, the geometry of third perforation 184, combined with spacer 290, may provide for an easy and/or faster installation and mounting of cabin attendant seat 100 to support structure 140.

A thickness of straps 150a and 150b, as measured from surface 156 to surface 158 and surface 176 to surface 178, respectively, and other material properties (e.g., ductility, plasticity, elasticity, etc.) of straps 150a and 150b may be selected based on the load and support structure to which mount assembly 128 will be attached. Stated differently, the thickness and materials of straps 150a and 150b may be tuned to the deflection of a particular support structure. In this regard, the thickness and material properties of straps 150a and 150b are selected such that straps 150a and 150b resist deformation during normal flight and gust events, and plastically deform (absorb energy) during a dynamic load event.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A cabin attendant seat comprising:
   a support structure;
   a housing mounted to the support structure;
   a first strap coupled to the housing, wherein the first strap is configured to plastically deform in response to translation of the housing away from the support structure, wherein the first strap comprises:
      a first perforation located proximate a first end of the first strap;
      a second perforation located proximate a second end of the first strap opposite the first end of the first strap; and
      a third perforation located between the first perforation and the second perforation;
   a first fastener located through the first perforation and coupled to the housing;
   a second fastener located through the second perforation and coupled to the housing, wherein a length of the first perforation is configured to allow the first end of the first strap to translate toward the first fastener and accommodate a plastic deformation of the first strap, and wherein a length of the second perforation is configured to allow the second end of the first strap to translate toward the second fastener and accommodate the plastic deformation of the first strap; and
   a third fastener located through the third perforation and coupled to the support structure.

2. The cabin attendant seat of claim 1, further comprising a first spacer extending from a first surface of the first strap, wherein the first spacer contacts a surface of the support structure.

3. The cabin attendant seat of claim 2, wherein:
the first perforation is aligned with a first fastener opening defined by the housing and the length of the first perforation, as measured in a first direction extending from the first end of the first strap to the second end of the first strap, is greater than a length of the first fastener opening, as measured in the first direction;
the second perforation is aligned with a second fastener opening defined by the housing and the length of the second perforation, as measured in the first direction, is greater than a length of the second fastener opening, as measured in the first direction; and
the third perforation is aligned with a third fastener opening defined by the support structure.

4. The cabin attendant seat of claim 2, further comprising:
a second strap coupled to the housing, the second strap comprising:
a first perforation aligned with a fourth fastener opening defined by the housing; and
a second perforation aligned with a fifth fastener opening defined by the support structure; and
a second spacer located proximate the second perforation of the second strap, wherein the second spacer contacts the surface of the support structure.

5. The cabin attendant seat of claim 4, wherein a geometry of the third perforation of the first strap is different from a geometry of the second perforation of the second strap.

6. A cabin attendant seat, the cabin attendant seat comprising:
a housing configured to mount to a support structure;
a first strap coupled to a wall of the housing, the first strap comprising:
a first perforation located proximate a first end of the first strap;
a second perforation located proximate a second end of the first strap opposite the first end of the first strap; and
a third perforation located between the first perforation and the second perforation, wherein the first strap is configured to plastically deform in response to a translation of the housing away from the support structure; and
a first fastener located through the first perforation and a first fastener opening of the housing, wherein a length of the first perforation, as measured in a first direction extending from the first end of the first strap to the second end of the first strap, is greater than a length of the first fastener opening, as measured in the first direction;
a second fastener located through the second perforation and a second fastener opening of the housing, wherein a length of the second perforation, as measured in the first direction, is greater than a length of the second fastener opening, as measured in the first direction; and
a spacer located through the third perforation and extending past a surface of the first strap; and
a third fastener located through the spacer, the third fastener being configured to engage the support structure.

7. The cabin attendant seat of claim 6, wherein the spacer is configured to contact a surface of the support structure.

8. The cabin attendant seat of claim 7, wherein a length of the spacer, as measured from the surface of the first strap, is less than a length of the wall of the housing, as measured from the surface of the first strap.

9. The cabin attendant seat of claim 7, further comprising a second strap coupled to the housing, the second strap comprising:
a first perforation located proximate a first end of the second strap;
a second perforation located proximate a second end of the second strap opposite the first end of the second strap; and
a third perforation located between the first perforation of the second strap and the second perforation of the second strap.

10. The cabin attendant seat of claim 9, wherein a geometry of the third perforation of the first strap is different from a geometry of the third perforation of the second strap.

* * * * *